United States Patent
Hsieh et al.

(10) Patent No.: US 8,059,753 B2
(45) Date of Patent: Nov. 15, 2011

(54) ADAPTIVE CHANNEL ESTIMATOR AND ADAPTIVE CHANNEL ESTIMATION METHOD

(75) Inventors: Yu-Tao Hsieh, Hsinchu (TW); Chao-Kai Wen, Taipei (TW); Jia-Hao Wu, Taoyuan County (TW); Pang-An Ting, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 928 days.

(21) Appl. No.: 11/798,762

(22) Filed: May 16, 2007

(65) Prior Publication Data

US 2008/0075182 A1   Mar. 27, 2008

Related U.S. Application Data

(60) Provisional application No. 60/846,088, filed on Sep. 21, 2006.

(51) Int. Cl.
*H03K 9/00* (2006.01)
*H04L 27/00* (2006.01)
*H04L 27/28* (2006.01)

(52) U.S. Cl. .......................... 375/316; 375/260

(58) Field of Classification Search .................. 375/224, 375/260, 316, 340, 350; 370/203, 210
See application file for complete search history.

(56) References Cited

U.S. PATENT DOCUMENTS

| | | |
|---|---|---|
| 5,513,221 A | 4/1996 | Parr et al. |
| 6,445,342 B1 | 9/2002 | Thomas et al. |
| 6,888,903 B1 | 5/2005 | Stenstrom et al. |
| 6,928,274 B2 | 8/2005 | Da Rocha et al. |
| 2004/0085917 A1 | 5/2004 | Fitton et al. |
| 2005/0213679 A1 | 9/2005 | Yamagata |
| 2005/0259770 A1 | 11/2005 | Chen |
| 2005/0265466 A1* | 12/2005 | Wang ............................ 375/260 |
| 2006/0045194 A1 | 3/2006 | Athanasios et al. |
| 2008/0031370 A1* | 2/2008 | Guey et al. .................... 375/260 |

OTHER PUBLICATIONS

Hoeher et al. "Pilot-symbol-aided channel estimation in time and frequency." Proc. Sixth Communication Theory Mini-Conf. Conjunction with IEEE GLOBECOM '97 Phoenix, AZ, pp. 90-96.
Taiwanese Office Action dated May 25, 2011; pp. 1-7.

* cited by examiner

*Primary Examiner* — Betsy Deppe
(74) *Attorney, Agent, or Firm* — Brich, Stewart, Kolasch & Birch, LLP (57) ABSTRACT

An adaptive channel estimator for estimating channel frequency responses when receiving OFDM symbols. The adaptive channel estimator comprises a channel estimator and a channel tracking module. The channel estimator generates one first channel frequency response for each OFDM symbol when operated in the first mode, and generates the channel frequency responses of a second channel frequency response for every N-th OFDM symbols when operated in the second mode, wherein N is a constant integer exceeding one and j is a non-negative integer. The channel tracking module indicates a channel status, and controls the channel estimator to operate in a first mode or a second mode according to the channel status.

24 Claims, 7 Drawing Sheets

ADAPTIVE CHANNEL ESTIMATOR AND ADAPTIVE CHANNEL ESTIMATION METHOD

This application claims the benefit of U.S. Provisional Application No. 60/846,088, filed Sep. 21, 2006, and entitled "MULTI-MODE CHANNEL TRACKING ALGORITHM IN OFDM SYSTEMS".

BACKGROUND OF THE INVENTION

Field of the Invention

The invention relates to communication systems, and more particularly, to channel parameter estimation techniques.

Figure 1:
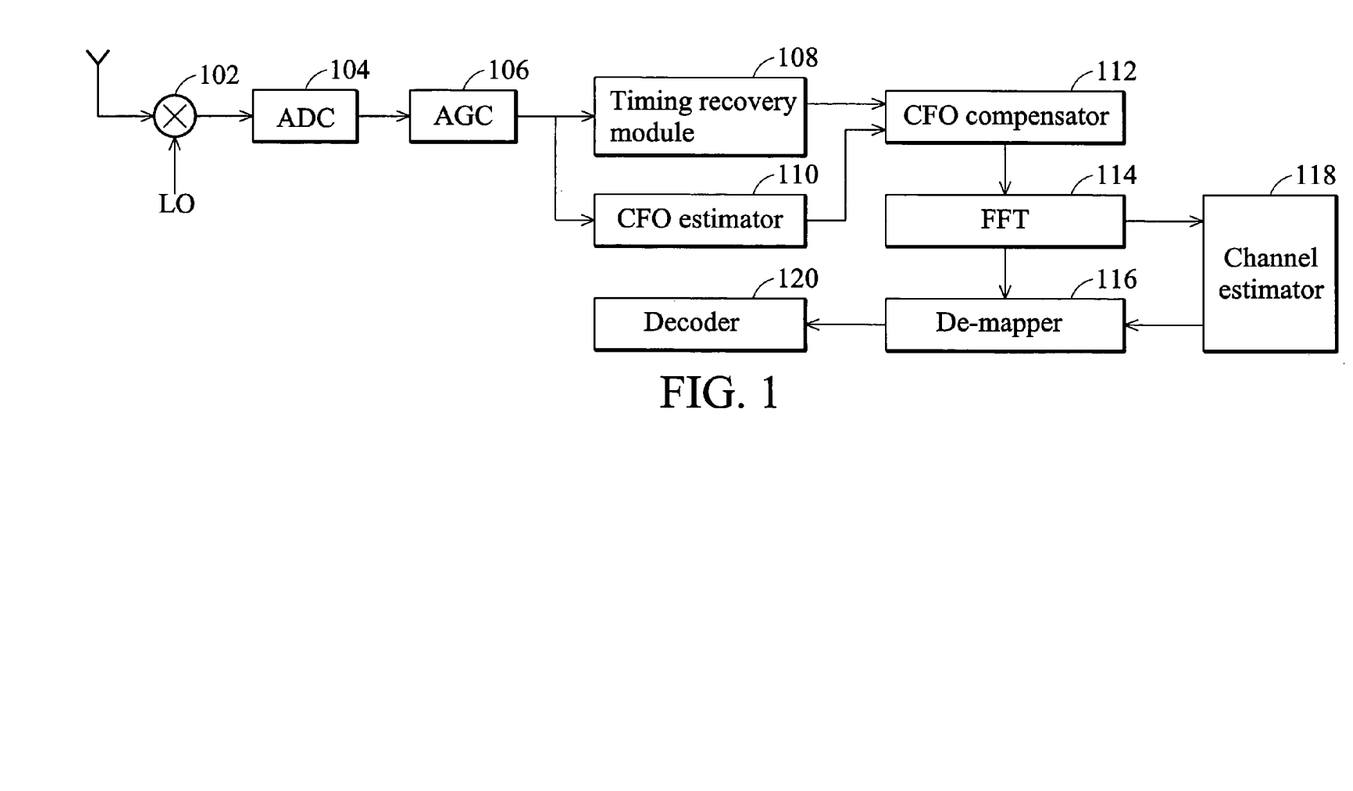
FIG. 1 shows a block diagram of an OFDM receiver.

Orthogonal Frequency Division Multiplexing (OFDM) is well known as a highly efficient spectral transmission scheme capable of handling severe channel impairment encountered in a wireless environment. The basic idea of OFDM is to divide the available spectrum into several sub-channels (sub-carriers). By making all sub-channels narrowband, they experience almost flat fading, thus, equalization is simplified. FIG. 1 shows a block diagram of an OFDM receiver. The received RF signal is down-converted into the baseband by a mixer 102. Subsequent to sampling and adjusting the down-converted signal by an analog-digital converter 104 and an auto-gain controller 106, the timing recovery module 108 must synchronize the symbol timing and frame timing of the baseband signals according to training symbols and preambles. The carrier frequency offset (CFO) is estimated by a CFO estimator 110 and compensated by a CFO compensation module 112 to mitigate the inter-carrier interference (ICI) due to frequency mismatching. The CFO compensated signal is passed through a fast Fourier transform (FFT) module 114 to transform the time domain data into frequency domain. The channel estimation results are fed into the demapper 116 and decoder 120 for demodulation and decoding. A mobile channel is usually time and frequency dispersive. Hence, the channel estimator 118 estimates and tracks the channel frequency response in mobile environments. Estimation of time-dispersive channels resulting from the movement between the transmitter and receiver, however, is still a challenging task for the channel estimation algorithm. Thus, the channel tracking algorithm plays an important role in OFDM systems in obtaining reliable channel estimation results.

The channel estimation algorithm can be classified into two categories. The first is the adaptive filter tap selection, and the other is the adaptive channel estimation architecture selection algorithm. The first type of channel estimation algorithm seeks to improve the channel estimation performance through proper selection of filter tap coefficients. The algorithm can be implemented in the time domain or frequency domain. For example, the channel estimation output is first obtained from the pilot sub-carriers on the time-frequency plane and then interpolates the pilot subcarrier channels by the selected filter to obtain the desired channel estimation of data sub-carriers. In the time-varying channels, the interpolation filters for interpolating the pilot subcarrier channels are adapted to different channel statistics and thus comprise parameters such as the signal to noise ratio (SNR), signal to interference ratio (SIR), delay spread and the Doppler spread.

It is well known that the wireless LAN-based OFDM system is only suitable for indoor environments and a quasi-static channel. Little attention, however, is paid to mobile scenarios. Also note the channel estimation module consumes excessive power in the mobile device. In order to increase longer battery life while maintaining system performance for use in mobile applications, it is more beneficial to use the estimated channel statistics to help the receiver reduce power consumption rather than only improve the receiver performance without power management. Thus, in the second type of channel estimation algorithm, the filter is adaptive in choosing different channel estimation architectures to balance performance and complexity.

Channel statistics are also assumed to be unchanged during a certain data packet. In mobile OFDM systems, however, users may communicate in a moving vehicle or from a stationary location in a building. When the channel is fast time-varying, the receiver must cope with rapid channel variation and high-speed movement. In this case a complicated channel estimation and channel tracking scheme is necessary to support high throughput data transmission. On the other hand, when the user slows down or does not move for a long time, however, it is desirable to enable a simplified channel tracking algorithm to reduce power consumption. This is directly related to battery life and is more critical in hand-held devices. In the proposed algorithm, a robust mode switching process is used and performs channel tracking with the most efficient mode.

BRIEF SUMMARY OF THE INVENTION

Accordingly, an effective yet simple channel tracking algorithm for mobile terminals in static or slow-moving environments is desirable. In one aspect of the invention, an adaptive channel estimator used for estimating channel frequency responses is provided. The adaptive channel estimator comprises a channel estimator and a channel tracking module. The channel estimator generates one first channel frequency response for each OFDM symbol when operated in the first mode, and generates the channel frequency responses of a second channel frequency response for every N-th OFDM symbols when operated in the second mode, wherein N is a constant integer exceeding one and j is a non-negative integer. The channel tracking module indicates a channel status, and controls the channel estimator to operate in a first mode or a second mode according to the channel status.

In another aspect of the invention, an adaptive channel estimating method is provided. The method comprises detecting a channel statistic metric. One operation mode from a plurality of operation modes is determined according to the channel statistic metric. A first channel frequency response for every ODFM symbol is then generated when operated in a first mode. A second channel frequency response of the j*N OFDM symbols is generated when operated in a second mode, wherein N is a constant exceeding one and j is a non-negative integer.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 2:
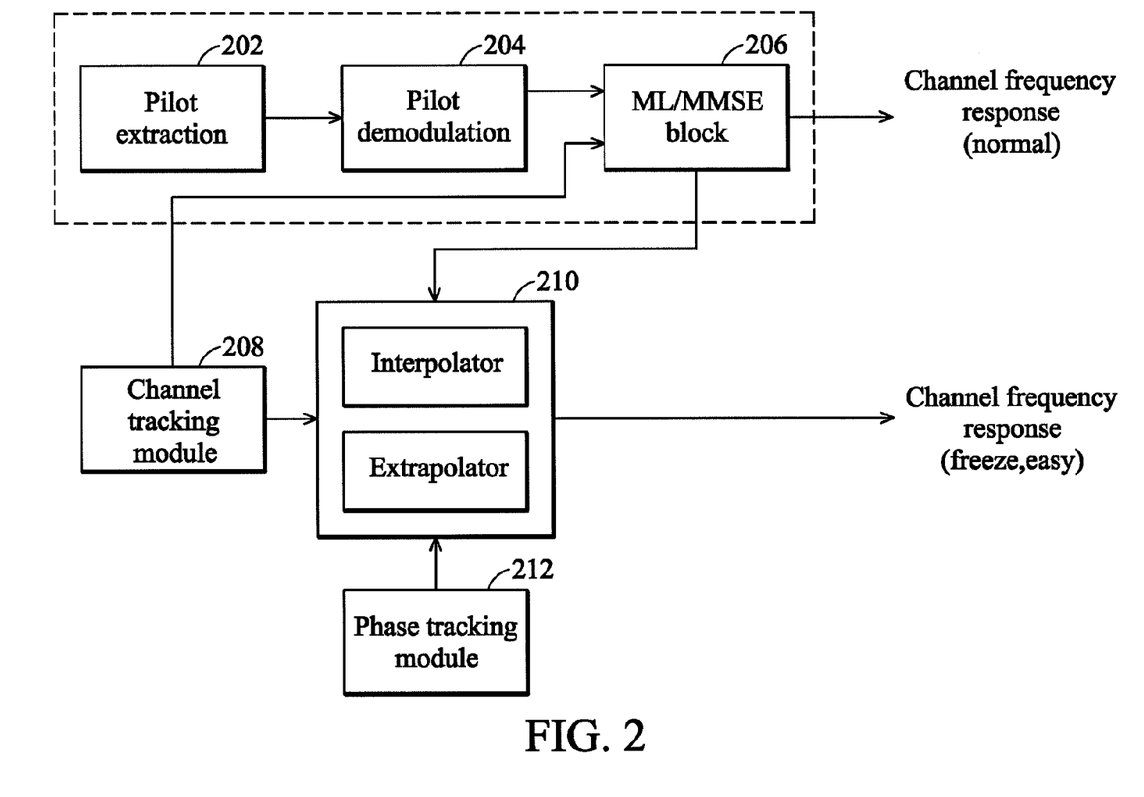
FIG. 2 shows a block diagram of channel estimation/tracking module 118 according to an embodiment of the invention.

FIG. 2 shows a block diagram of channel estimation/tracking module 118 according to an embodiment of the invention. The channel estimation/tracking module 118 estimates and tracks the channel frequency response in mobile environments. Pilot extraction module 202 extracts distinct pilot sub-carriers from an OFDM symbol. Pilot demodulator 204 generates the channel characteristics of pilot sub-channels. The operations of block 206-212 depend on the operation mode of the channel estimator 118. In one embodiment of the invention, the operation modes of the channel estimator 118 are classified as a first mode (Normal mode) and a second mode. The operation modes are switched when receiving a new OFDM frame for tracking channel variation. The ML/MMSE block 206 is activated in Normal mode, and estimates the channel frequency response according to the results of pilot demodulation. The channel tracking module 208 monitors the channel variation at each OFDM frame, and informs the ML/MMSE block 206 and activates filter 210 when operating in the second mode.

In Normal mode, a high-performance channel estimation approach is utilized to track the high-speed channel variation, and the channel estimation outputs within an OFDM frame are updated symbol by symbol. In most OFDM systems the pilots are allocated along with the data sub-carriers in a communication channel. The pilots can be extracted and demodulated for providing initial pilot channel estimation by the pilot extraction module 202 and the pilot demodulator 204. The channel estimation of data sub-carriers can be interpolated using the maximum-likelihood (ML) or minimum mean square error (MMSE) criterion estimation along the frequency axis.

In the second mode, the channel estimator performs a simple yet effective channel estimation. In some embodiments, the second mode further comprises a Easy mode or a Freeze mode. In the Easy mode, the timing variation of a slow-moving channel is assumed to be linear with time. In one embodiment of the invention, the channel frequency response can be generated by interpolating certain sub-carrier channels estimation, such as pilot sub-carriers. For example, the channel estimation outputs for a sub-carrier k can be represented by $$h_k(n) = \frac{M-n}{M} h_k(0) + \frac{n}{M} h_k(M), n = 1, 2, \ldots, M-1,  \quad \text{Eqn (1)}$$

where M is the span of the OFDM symbols, and $h_k(0)$ and $h_k(M)$ of the equation are the channel frequency responses of k-th sub-carrier in the 0-th and M-th OFDM symbol, respectively, using the Normal mode tracking approach. In other embodiments of the invention, the channel frequency response can be generated by extrapolating other sub-carrier channels estimation. For example, the channel estimation outputs for a certain sub-carrier k can be represented by $$h_k(n) = \frac{M+n}{M} h_k(0) - \frac{n}{M} h_k(-M), n = 1, 2, \ldots, M-1. \quad \text{Eqn (2)}$$

The interpolation option performs better than extrapolation, but the time delay is somewhat longer.

Other approaches, such as curve-fitting and approximation by polynomials, capable of performing substantially the same operations also fall within the scope of the invention.

In Freeze mode, the channel estimator 118 does not update channel frequency response symbol by symbol. The channel frequency response is updated after predetermined symbols. For example, the channel frequency response is updated after four symbols. In Freeze mode, the mobile device is stationary and the computation burden from the channel estimator/tracking module is significantly reduced. In some embodiments, the threshold speed to activate Freeze mode is about 1 km/hr.

In a realistic receiver design, RF impairment, such as carrier frequency offset or phase noise can make the channel estimation output deviate slightly from the desired values along with time. Thus, in some embodiments, a phase tracking module is required in Freeze mode.

A detailed description of the Freeze and Easy mode operations within each frame are described in the following. Since the Easy mode works well under the assumption of linear variation with time, the channel frequency response for linear interpolation or extrapolation should not be too far apart in the time domain. In other words, the channel frequency response should be updated in only a few symbols. In some embodiments, the update frequency is four symbols per channel frequency response. That is, the channel frequency response of every four OFDM symbols are estimated by channel estimator/tracking module, the other three channel frequency responses are interpolated or extrapolated therefrom along the time axis. The estimated channel frequency response, in some embodiments, is estimated by applying the approach used in Normal mode. In Freeze mode, the channel estimation outputs are produced with a period of a few symbols, where the first symbol is calculated by the approach used in Normal mode with the other symbols borrowing the channel estimation outputs of the first symbol.

Table 1 shows three channel types and the corresponding channel estimation approaches.

TABLE 1

An example of the channel types, operation modes, and the corresponding channel tracking approaches.

| Channel types | Speed | Operating mode of the channel estimator | Channel estimation approaches |
| --- | --- | --- | --- |
| Fast-moving | >30 km/hr | Normal | ML/MMSE in frequency domain |
| Slow-moving | 1~30 km/hr | Easy | Linear interpolation/extrapolation in time domain |
| Static | <1 km/hr | Freeze | Borrow the previous symbol (with or without phase tracking) |

Figure 3A:
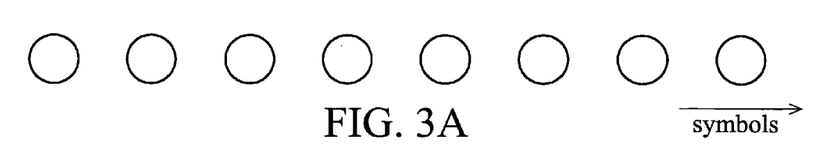
FIG. 3A-3C respectively shows an example of the timing for updating the channel frequency response in Normal mode, Easy mode, and Freeze mode.
Figure 3B:
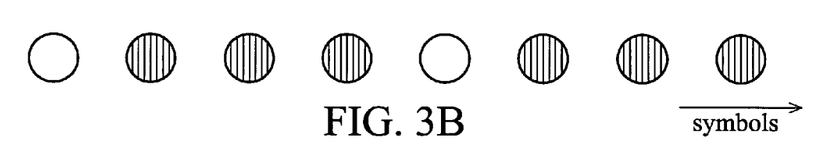
Figure 3C:
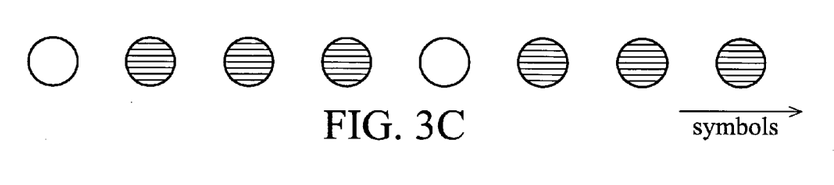

FIG. 3A-3C respectively shows an example of the timing for updating the channel frequency response in Normal mode, Easy mode, and Freeze mode. When operated in Normal mode, the channel frequency response is updated symbol by symbol, shown as circles in FIG. 3A. When operated in Easy mode, the channel frequency response is estimated according to time-domain interpolation or extrapolation. The circles in FIG. 3B are estimated OFDM symbols, while the shaded dots in FIG. 3B are interpolated or extrapolated by the circles. When operated in Freeze mode, the channel frequency response is periodically updated every four symbols. The circles in FIG. 3C represent estimated OFDM symbols, while the shaded dots in FIG. 3C are symbols without updating channel frequency response.

In Normal mode, the channel frequency response of each OFDM symbol is analyzed at the sacrifice of high computational complexity. For example, a filter with about ten complex taps may be used in high-speed channels. This requires ten complex multiplication operations as well as other minor operations per. Easy mode requires fewer computations than Normal mode. For example, in an example with an update frequency of four symbols, only two real multiplications are required and are simpler than Normal mode. In this situation, the time-domain filtering of nearby channel estimations suffices to provide adequate quality. Note that in Easy mode, the channel estimator/tracking module may not rely on the pilot channel estimates to produce the primitive channel estimates. Rather, the channel estimation accuracy in this mode entails the accuracy of the neighboring symbols and the validity of linear property for the low-velocity channels.

To determine which operation mode the channel estimator 118 operates, a detector monitoring channel variation is required. In some embodiments of the invention, a correlation-based metric $C_X(m)$ may be calculated from channel frequency responses of pilot sub-carriers estimation in the training or data symbols, as expressed by $$X(m) = \frac{1}{P}\sum_{k=0}^{P-1}\{\text{Re}(h_k(m,0))\cdot\text{Re}(h_k(m,L)) + \qquad \text{Eqn. (3)}$$
$$\text{Im}(h_k(m,0))\cdot\text{Im}(h_k(m,L))\}$$
$$W(m) = \frac{1}{P}\sum_{k=0}^{P-1}\{\text{Re}(h_k(m,0))^2 + \text{Im}(h_k(m,0))^2\}$$
$$C_X(m) = (1-\lambda)\cdot C_X(m-1) + \lambda\cdot X(m)/W(m).$$

Preferably, a channel inverse mean square error (IMSE) is used for a new channel variation metric $C_I(m)$ as follows:

$$D(m) = \frac{1}{P}\sum_{k=0}^{P-1}\{[\text{Re}(h_k(m,0)) - \text{Re}(h_k(m,L))]^2 + \qquad \text{Eqn. (4)}$$
$$[\text{Im}(h_k(m,0)) - \text{Im}(h_k(m,L))]^2\}$$
$$W(m) = \frac{1}{P}\sum_{k=0}^{P-1}\{\text{Re}(h_k(m,0))^2 + \text{Im}(h_k(m,0))^2\}$$
$$C_I(m) = (1-\lambda)\cdot C_I(m-1) + \lambda\cdot W(m)/D(m)$$

where P represents the summation number of pilot sub-carriers, $h_k(m,n)$ denotes the channel estimation of the n-th symbol in the m-th frame, k is sub-carrier index, □ is a smoothing factor, L is a constant exceeding one, and W(m) and λ are identical to those in the conventional correlation-based algorithm in Eqn. (3). The IMSE metric is monotonic decreasing alone with increased speed, which is similar to $C_X(m)$. The difference of the IMSE lies in that it would amplify the difference outputs at low velocities than at high velocities. Since the low-speed region is of greatest concern, the proposed IMSE metric is more sensitive to velocity variation in low-speed regions than the correlation-based metric for determining the channel tracking mode.

Figure 4:
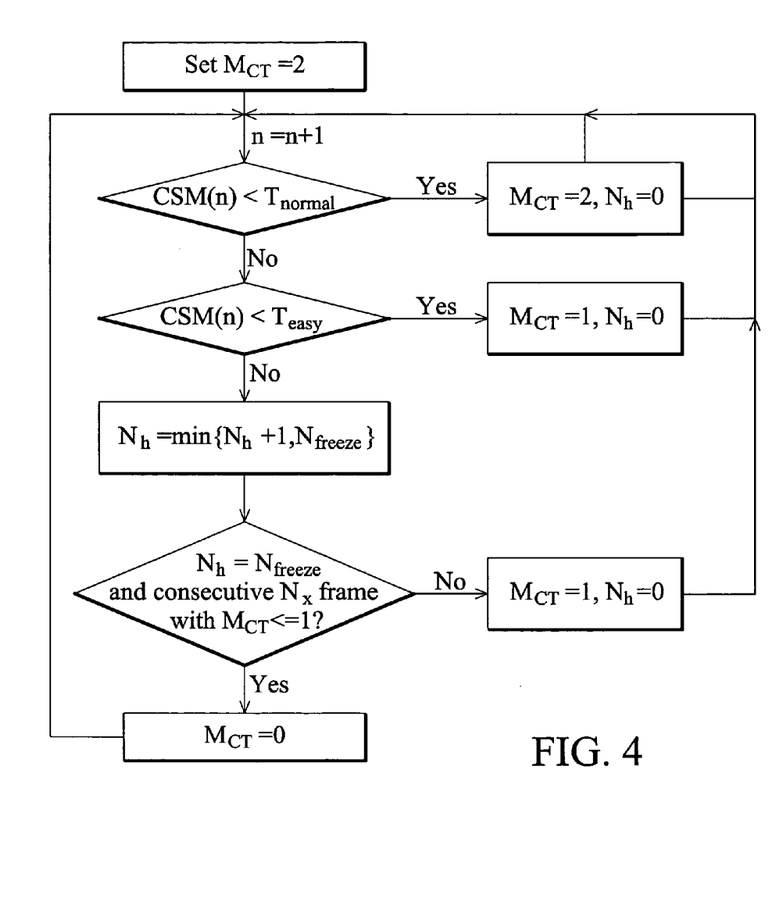
FIG. 4 shows a flow chart of the channel tracking method applying a channel statistic metric (CSM)

FIG. 4 shows a flow chart of one example of the channel tracking method applying a channel statistic metric (CSM). Two threshold values, $T_{Normal}$ and $T_{Easy}$, are determined. The channel statistic metric is updated once per frame and the mode switch is activated in the beginning of each frame. In the initialization phase, no channel information is available and the tracking mode is then set as Normal mode ($M_{CT}=2$). When the CSM C(m) ($C_X(m)$ or $C_I(m)$) falls below $T_{Normal}$, the channel tracking mode is set as the Normal mode. Otherwise, if C(m) is greater than $T_{Normal}$ but is less than $T_{Easy}$, the estimated channel speed is slow, thus, channel tracking mode is switched to Easy mode ($M_{CT}=1$). When C(m) is greater than $T_{Easy}$, the current frame is not immediately set to Freeze mode, but rather remains in Easy mode. Only when previous $N_x$ consecutive frames the modes of which are either $M_{CT}=0$ or $M_{CT}=1$, and when previous consecutive $N_{Freeze}$ frames the CSM values of which all exceed $T_{Easy}$ does the channel tracking enter Freeze mode as $M_{CT}=0$.

Figure 5:
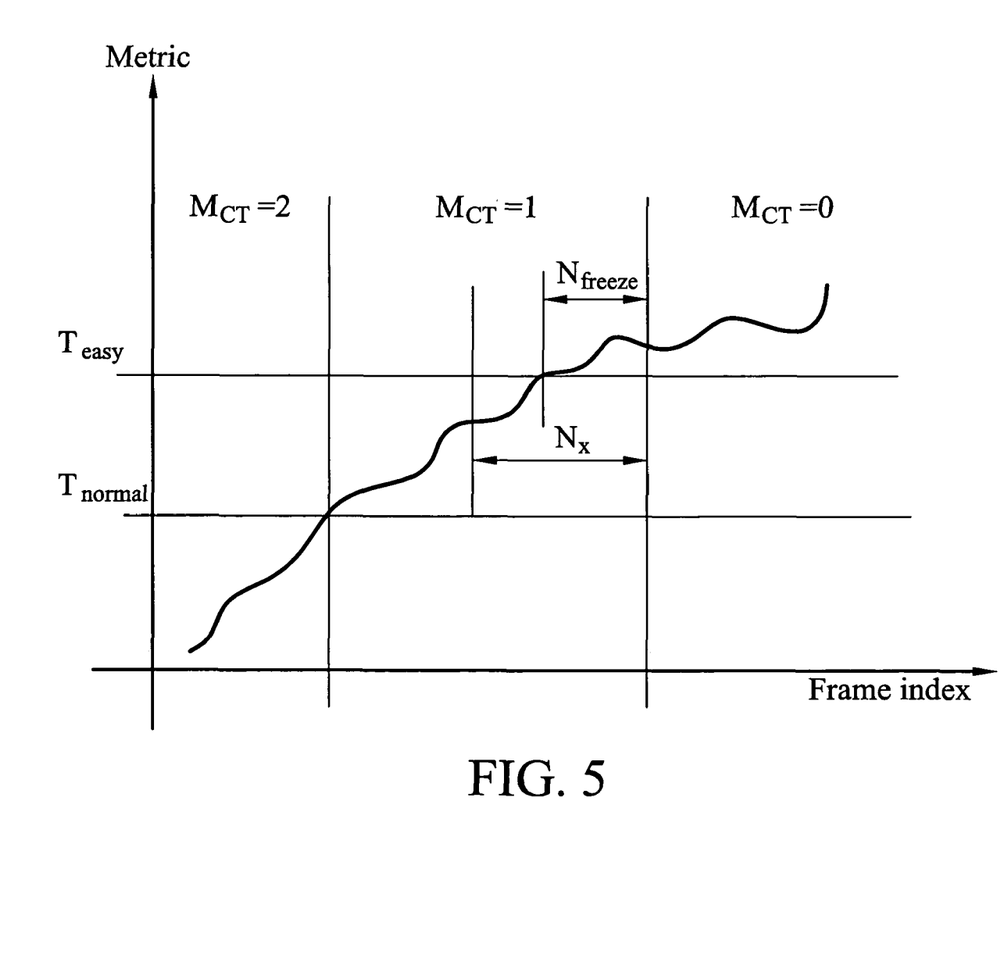
FIG. 5 shows an example of the CSM values and the correspondent mode ($M_{CT}$)

FIG. 5 shows an example of the CSM values and the correspondence $M_{CT}$. The operation mode is selected as Normal mode($M_{CT}=2$) in the beginning. When the CSM exceeds $T_{Normal}$, the Easy mode ($M_{CT}=1$) is selected. When the CSM exceed $T_{Normal}$ for $N_x$ consecutive frames and also exceeds $T_{Easy}$ for $N_{Freeze}$ frames, the Freeze mode is selected.

Figure 6A:
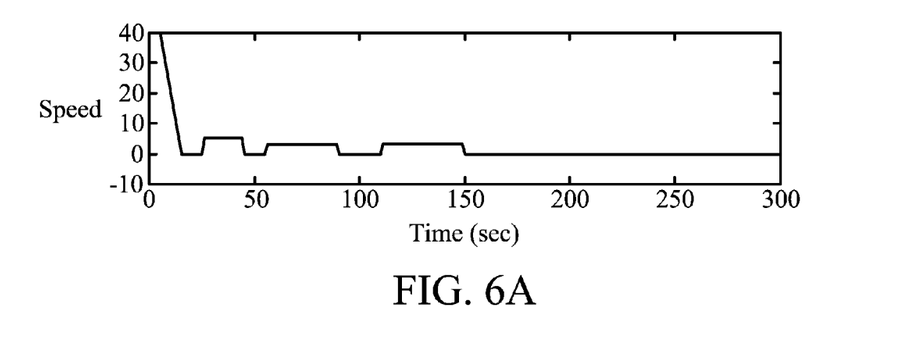
FIG. 6A-6C show an example of the walking-type channel.
Figure 6B:
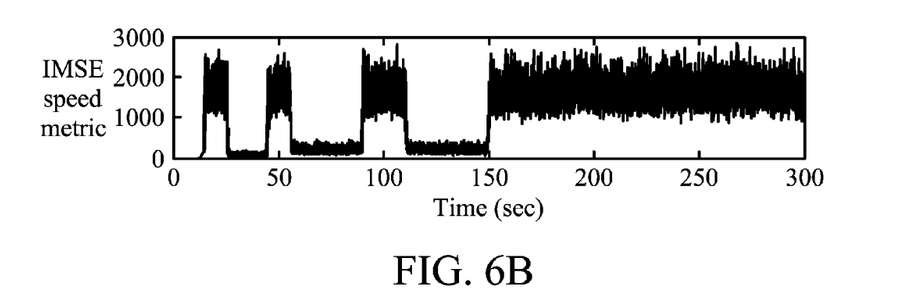
Figure 6C:
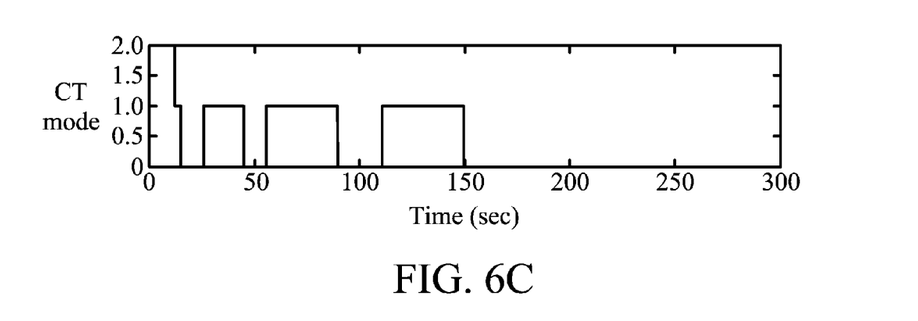

To further illustrate the channel tracking method, two examples are described. In the following examples, the frame durations are all set as 5 ms and SNR=23 dB in vehicular A model of 3GPP channel model. FIG. 6A-6C show an example of the walking-type channel. In FIG. 6A, a speed profile, along with time, is plotted to simulate a user driving slowing down and stopping. The user then walks to his home or office to communicate using the mobile terminal. In this case, the user speed is typically slow and suitable for the proposed algorithm. Table 2 lists the percentages of the three modes. FIG. 6B shows that the speed metric (IMSE metric) tracks the varying speeds. FIG. 6C shows the mode-switching procedure selecting a proper tracking mode in each frame. Table 3 shows that for the relative hit rates of three speed modes the proposed algorithm performs very well in all modes. The power saving rate, which is defined as the ratio of the total frames in the entries (A), (B), and (D) to the overall frame count, is 95.4%. The probability of missing detection, which is defined as the ratio of the total frames in the entries (C), (E), and (F) to the overall frame count, is merely 0.4%. This shows that the tracking method is able to effectively recognize the low-speed frames from high-speed frames with fast convergence time.

TABLE 2

Percentage of three modes present in the walking-type channel model

| | Actual mode | | |
|---|---|---|---|
| | Freeze | Easy | Normal |
| Percentage | 64% | 33.5% | 2.5% |

TABLE 3

Relative hit rate for three modes of the walking-type channel model

| Actual | Detected | | | |
|---|---|---|---|---|
| | Freeze | Easy | Normal | Summation |
| Freeze | 100% (A) | 0% (B) | 0% | 100% |
| Easy | 1.2% (C) | 93.9% (D) | 4.9% | 100% |
| Normal | 0% (E) | 0% (F) | 100% | 100% |

Figure 7A:
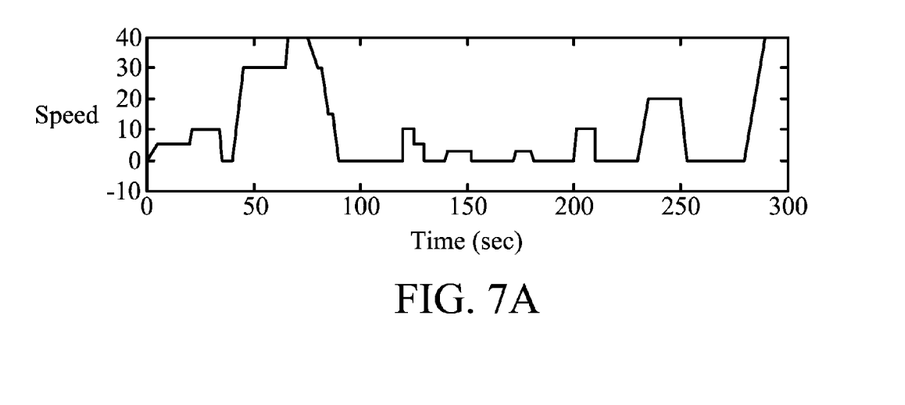
FIG. 7A-7C show an example of the driving-type channel.
Figure 7B:
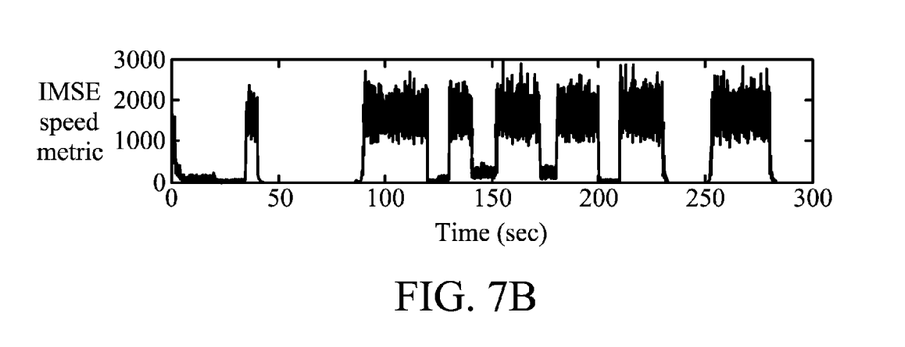
Figure 7C:
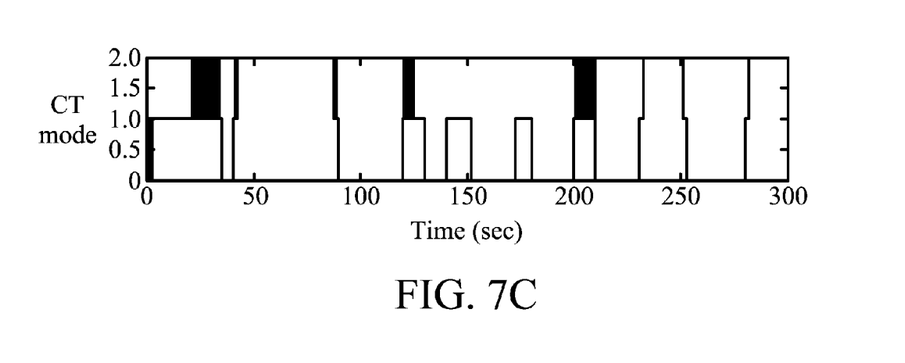

In the second example as shown in FIG. 7A-7C, a simulated scenario of users in a traffic jam, the driving-type channels are chosen to verify the proposed tracking method in low-speed moving vehicles. The speed distribution of the channel in terms of modes is represented in Table 4. Similar to the first example, the proposed channel tracking method tracks the varying speeds frame by frame. The power-saving rate in this case is 82.3% and the probability of missing detection is only 0.8%. These two examples demonstrate the effectiveness and robustness of the proposed method.

TABLE 4

Percentage of three modes present in the driving-type channel model

| | Actual mode | | |
|---|---|---|---|
| | Freeze | Easy | Normal |
| Percentage | 44.7% | 38.8% | 16.5% |

TABLE 5

Relative hit rate for three modes of the driving-type channel model

| Actual | Detected | | | |
|---|---|---|---|---|
| | Freeze | Easy | Normal | Summation |
| Freeze | 99.7% (A) | 0.3% (B) | 0% | 100% |
| Easy | 2.1% (C) | 61.8% (D) | 36.1% | 100% |
| Normal | 0% (E) | 0% (F) | 100% | 100% |

A rough comparison of computation complexity for three modes is compared in Table 6. It can be shown that the Easy mode or Freeze mode can reduce the complexity of the channel tracking algorithm to the extent of 30%. On the other hand, the overhead computation for speed metric calculation is also considered in Table 7. It can be found that, as compared to the frame-based initial channel estimation, the speed metric requires only 2% of the complexity for the channel estimation. Thus, the reduced complexity of the proposed algorithm is attractive.

TABLE 6

Computation complexity of three modes for the proposed algorithm

| Mode | MUL | ADD | Total |
|---|---|---|---|
| Normal | 922K | 865K | 5.48M |
| Freeze | 244K | 360K | 1.6M |
| Easy | 271K | 271K | 1.6M |

TABLE 7

Computation overhead of frame-based speed metric calculation.

| Mode | MUL | DIV | ADD | Total |
|---|---|---|---|---|
| Preamble CE | 28K | 0 | 26K | 165K |
| Correlation | 0.5K | 1 | 0.5K | 2.9K |
| Inverse MSE | 0.5K | 1 | 0.5K | 2.9K |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adaptive channel estimator for estimating channel frequency responses when receiving OFDM symbols, comprising:
a channel estimator generating a first channel frequency response for each one of a plurality of first OFDM symbols when operated in a first mode wherein the first OFDM symbols are continuous in time axis, and generating a second channel frequency response for each one of a plurality of second OFDM symbols when operated in a second mode, wherein each one of the second OFDM symbols is separated from the other one of the second OFDM symbols by M−1 non-second symbols in time axis and M is a constant integer exceeding one; and
a channel tracking module indicating a channel status, and controlling the channel estimator to selectively operate in the first mode or the second mode according to the channel status, wherein the channel status is obtained by the channel tracking module, which monitors a function of time variation of the channel.

2. The adaptive channel estimator as claimed in claim 1, wherein each of the first OFDM symbols, the second OFDM symbols and the non-second OFDM symbols comprises a plurality of pilot sub-carriers, a plurality of data sub-carriers and pilot sub-carriers, or a plurality of data sub-carriers.

3. The adaptive channel estimator as claimed in claim 1, wherein the channel status can be identified according to a channel status indicator $C_I(m)$ which can be expressed as:

$$C_I(m) = (1-\lambda) \cdot C_I(m-1) + \lambda \cdot \frac{W(m)}{D(m)}, \text{ where}$$

$$W(m) = \frac{1}{P}\sum_{k=0}^{P-1}\{\text{Re}(h_k(m,0))^2 + \text{Im}(h_k(m,0))^2\},$$

$$D(m) =$$
$$\frac{1}{P}\sum_{k=0}^{P-1}\{[\text{Re}(h_k(m,0)) - \text{Re}(h_k(m,L))]^2 + [\text{Im}(h_k(m,0)) - \text{Im}(h_k(m,L))]^2\},$$

P represents the summation number of pilot sub-carriers, $h_k(m,n)$ denotes the channel estimation of the n-th symbol in the m-th frame, k is sub-carrier index, and $\lambda$ is a smoothing factor.

4. The adaptive channel estimator as claimed in claim 3, wherein when the $C_I(m)$ is less than a predetermined threshold, the channel estimator is set to operate in the first mode; when the $C_I(m)$ exceeds the predetermined threshold, the channel estimator is set to operate in the second mode.

5. The adaptive channel estimator as claimed in claim 1, wherein the channel status can be identified according to a moving velocity of the channel estimator.

6. The adaptive channel estimator as claimed in claim 1, wherein the channel status is updated when receiving a new OFDM frame.

7. The adaptive channel estimator as claimed in claim 1, wherein the channel estimator further comprises a filter linearly filtering the second channel frequency responses of the second OFDM symbols to generate the second channel frequency responses of the non-second OFDM symbols.

8. The adaptive channel estimator as claimed in claim 7, wherein the second channel frequency responses of the non-second OFDM symbols are generated by performing the following equation:

$$h_k(j*N - i) = \frac{N-i}{N} h_k((j-1)*N) + \frac{i}{N} h_k(j*N),$$

wherein $h_k(0)$ and $h_k(M)$ of the equation are the second channel frequency responses of k-th sub-carrier in the 0-th and M-th OFDM symbol, respectively, and M is the span of the second OFDM symbols performing the equation.

9. The adaptive channel estimator as claimed in claim 7, wherein the second channel frequency responses of the non-second OFDM symbols are generated by performing the following equation:

$$h_k(j*N - i) = \frac{N+i}{N} h_k((j-1)*N) - \frac{i}{N} h_k((j-2)*N),$$

wherein $h_k(0)$ and $h_k(M)$ of the equation are the second channel frequency responses of k-th sub-carrier in the 0-th and M-th OFDM symbol, respectively, and M is the span of the second OFDM symbols performing the equation.

10. The adaptive channel estimator as claimed in claim 7, wherein the adaptive channel estimator can be further operated in a third mode; when operated in the third mode, the adaptive channel estimator generates the second channel frequency responses for the second OFDM symbols and generates the second channel frequency responses of the non-second OFDM symbols by utilizing the second channel frequency responses of one of the second OFDM symbols.

11. The adaptive channel estimator as claimed in claim 10, wherein the channel status can be identified according to a channel status indicator $C_f(m)$ which can be expressed as:

$$C_I(m) = (1 - \lambda) \cdot C_I(m-1) + \lambda \cdot \frac{W(m)}{D(m)}, \text{ wherein}$$

$$W(m) = \frac{1}{P}\sum_{k=0}^{P-1} \{\text{Re}(h_k(m, 0))^2 + \text{Im}(h_k(m, 0))^2\},$$

$$D(m) = \frac{1}{P}\sum_{k=0}^{P-1} \{[\text{Re}(h_k(m, 0)) - \text{Re}(h_k(m, L))]^2 + [\text{Im}(h_k(m, 0)) - \text{Im}(h_k(m, L))]^2\},$$

P represents the summation number of pilot sub-carriers, $h_k(m,n)$ denotes the channel estimation of the n-th symbol in the m-th frame, k is sub-carrier index, and $\lambda$ is a smoothing factor, and L is a constant exceeding one, when the $C_f(m)$ is less than a first predetermined threshold, the channel estimator is set to operate in the first mode; when the $C_f(m)$ is not lower than the first predetermined threshold for consecutive J frames and the $C_f(m)$ of the previous L consecutive frames are also higher than a second predetermined threshold, the channel estimator is set to operate in the third mode; otherwise, the channel estimator is set to operate in the second mode, wherein J and L are positive integers.

12. The adaptive channel estimator as claimed in claim 1, wherein M is 4.

13. An adaptive channel estimating method, comprising:
detecting a channel statistic metric;
determining one operation mode from a plurality of operation modes according to the channel statistic metric, wherein the channel statistic metric is a function of time variation of a channel;
generating a first channel frequency response for each one of a plurality of first OFDM symbols when operating in a first mode, wherein the first OFDM symbols are continuous in time axis; and
generating a second channel frequency response for each one of a plurality of second OFDM symbols when operating in a second mode, wherein each one of the second OFDM symbols is separated from the other one of the second OFDM symbols by M−1 non-second symbols in time axis and M is a constant exceeding one.

14. The adaptive channel estimating method as claimed in claim 13, wherein each of the first OFDM symbols, the second OFDM symbols and the non-second OFDM symbols comprises a plurality of pilot sub-carriers, a plurality of data sub-carriers and pilot sub-carriers, or a plurality of data sub-carriers.

15. The adaptive channel estimating method as claimed in claim 13, further comprising determining to operate in the first mode when the channel statistic metric is less than a predetermined threshold value; otherwise, determining to operate in the second mode.

16. The adaptive channel estimating method as claimed in claim 13, wherein the channel statistic metric of the m-th OFDM frame $C_f(m)$ can be expressed as:

$$C_I(m) = (1 - \lambda) \cdot C_I(m-1) + \lambda \cdot \frac{W(m)}{D(m)}, \text{ wherein}$$

$$W(m) = \frac{1}{P}\sum_{k=0}^{P-1} \{\text{Re}(h_k(m, 0))^2 + \text{Im}(h_k(m, 0))^2\},$$

$$D(m) = \frac{1}{P}\sum_{k=0}^{P-1} \{[\text{Re}(h_k(m, 0)) - \text{Re}(h_k(m, L))]^2 + [\text{Im}(h_k(m, 0)) - \text{Im}(h_k(m, L))]^2\},$$

P represents the summation number of pilot sub-carriers, $h_k(m,n)$ denotes the channel estimation of the n-th symbol in the m-th frame, k is sub-carrier index, and $\lambda$ is a smoothing factor.

17. The adaptive channel estimating method as claimed in claim 16, wherein when the $C_f(m)$ is less than a predetermined threshold, the operation mode is set to operate in the first mode; otherwise, the operation mode is set to operate in the second mode.

18. The adaptive channel estimating method as claimed in claim 13, wherein the operation mode is updated when receiving a new OFDM frame.

19. The adaptive channel estimating method as claimed in claim 13, further comprising linearly filtering the second channel frequency responses of the second OFDM symbols to generate the second channel frequency responses of the non-second OFDM symbols.

20. The adaptive channel estimating method as claimed in claim 19, wherein the second channel frequency responses of the non-second OFDM symbols are generated by performing the following equation:

$$h_k(n) = \frac{M-n}{M}h_k(0) + \frac{n}{M}h_k(M), n = 1, 2, \ldots, M-1,$$

wherein $h_k(0)$ and $h_k(M)$ of the equation are the second channel frequency responses of k-th sub-carrier in the 0-th and M-th OFDM symbol, respectively, and M is the span of the second OFDM symbols performing the equation.

21. The adaptive channel estimating method as claimed in claim 19, wherein the second channel frequency responses of the non-second OFDM symbols are generated by performing the following equation:

$$h_k(n) = \frac{M+n}{M}h_k(0) - \frac{n}{M}h_k(M), n = 1, 2, \ldots, M-1,$$

wherein $h_k(0)$ and $h_k(M)$ of the equation are the second channel frequency response responses of k-th sub-carrier in the 0-th and M-th OFDM symbol, respectively, and M is the span of the second OFDM symbols performing the equation.

22. The adaptive channel estimating method as claimed in claim 19, further comprising generating the second channel frequency responses for the second OFDM symbols and generating the second channel frequency responses of the non-second OFDM symbols in a third mode by utilizing the second channel frequency response of one of the second OFDM symbols.

23. The adaptive channel estimating method as claimed in claim 22, wherein the channel statistic metric can be identified according to a channel status indicator $C_f(m)$ which can be expressed as:

$$C_I(m) = (1-\lambda) \cdot C_I(m-1) + \lambda \cdot \frac{W(m)}{D(m)}, \text{ wherein}$$

$$W(m) = \frac{1}{P}\sum_{k=0}^{P-1}\{\text{Re}(h_k(m,0))^2 + \text{Im}(h_k(m,0))^2\},$$

$$D(m) = \frac{1}{P}\sum_{k=0}^{P-1}\{[\text{Re}(h_k(m,0)) - \text{Re}(h_k(m,L))]^2 + [\text{Im}(h_k(m,0)) - \text{Im}(h_k(m,L))]^2\},$$

P represents the summation number of pilot sub-carriers, $h_k(m,n)$ denotes the channel estimation of the n-th symbol in the m-th frame, k is sub-carrier index, $\lambda$ is a smoothing factor, and L is a constant exceeding one, when the $C_f(m)$ is less than a first predetermined threshold, the operation mode is set to operate in the first mode; when the $C_f(m)$ is not lower than the first predetermined threshold for J consecutive frames and the $C_f(m)$ of the previous L consecutive frames are also higher than a second predetermined threshold, the operation mode is set to operate in the third mode; otherwise, the operation mode is set to operate in the second mode, wherein J and L are positive integers.

24. The adaptive channel estimating method as claimed in claim 13, wherein M is 4.

* * * * *